United States Patent [19]

Hanley

[11] Patent Number: 4,547,878

[45] Date of Patent: Oct. 15, 1985

[54] NON-LINEAR ADDER

[75] Inventor: Michael J. Hanley, Hickory Hills, Ill.

[73] Assignee: Rockwell International Corporation, El Segundo, Calif.

[21] Appl. No.: 508,703

[22] Filed: Jun. 28, 1983

[51] Int. Cl.[4] .......................................... H04Q 11/04
[52] U.S. Cl. ..................................................... 370/62
[58] Field of Search ....................... 370/62; 179/18 BC

[56] References Cited

U.S. PATENT DOCUMENTS

| | | | |
|---|---|---|---|
| 4,097,694 | 6/1978 | Miyazaki | 370/62 |
| 4,215,247 | 7/1980 | Lambert | 179/18 BC |
| 4,274,155 | 6/1981 | Funderburk et al. | 370/62 |
| 4,325,139 | 4/1982 | van Dine | 179/18 BC |
| 4,387,457 | 6/1983 | Münter | 370/62 |
| 4,389,720 | 6/1983 | Baxter et al. | 370/62 |
| 4,393,496 | 7/1983 | Zeihaeg | 179/18 BC |
| 4,416,007 | 11/1983 | Huizinga et al. | 370/62 |
| 4,425,478 | 1/1984 | van Mil et al. | 179/18 BC |
| 4,430,734 | 2/1984 | Hubbard | 370/62 |

FOREIGN PATENT DOCUMENTS

| | | |
|---|---|---|
| 6014044 | 9/1980 | European Pat. Off. . |
| 2905426 | 9/1980 | Fed. Rep. of Germany . |
| 0033933 | 2/1981 | Fed. Rep. of Germany . |
| WO83/02205 | 6/1983 | PCT Int'l Appl. . |

OTHER PUBLICATIONS

GTD-4600 Network Description, Jacob, Mar. 1978.

Primary Examiner—Douglas W. Olms
Assistant Examiner—Curtis Kuntz
Attorney, Agent, or Firm—Carmen B. Patti; V. Lawrence Sewell; H. Fredrick Hamann

[57] ABSTRACT

This disclosure depicts a non-linear adder circuit for teleconferencing. A pre-determined number of most significant bits (MSB) is utilized from a first PCM signal to select one of a plurality of PROMs. Each of the PROMs receives a second predetermined number of bits, other than the bits used for selecting from the first PCM signal, and the predetermined number of bits from a second PCM signal. The unique address locations within the PROMs of the first and second PCM signals are stored. From this address location a third PCM signal is outputted which is a non-linear addition of the first and second PCM signals.

2 Claims, 2 Drawing Figures 4,547,878

NON-LINEAR ADDER

BACKGROUND OF THE INVENTION

The present invention relates in general to telephonic voice communication switching, and in particular, to conferencing wherein telephone conversation between two or more parties is possible. As is well known to those skilled in the art, many techniques of a wide range of complexity are used to achieve telephone conference connections. In analog systems, 3-party conferences are frequently implemented by bridging the third party across an existing 2-party circuit, while complex conference circuits are reserved for large conferences.

The advent of pulse code modulation (PCM), digital voice transmission, and switching systems has stimulated the development of new conferencing techniques which operate directly on the digital representation of voice. One important reason is that in PCM systems, the simple technique of connecting the third party to an existing 2-party call does not result in meaningful addition in mixing of the three digital signals as it does in the analog case, and thus, in the digital implementation some sort of algebraic operation is required even for small conferences. Conferencing techniques may be classified as additive or switched, and analog and digital mechanizations may be found in the prior art for both approaches.

In the additive technique, each conferee receives the algebraic sum of the signals of the other conferees. In the switch technique, an attempt is made to discover which conferee is the speaker. The speaker's signal alone is then sent to the other conferees, while the speaker may receive either a zero signal or the signal from the previous speaker. Alternatively, in a new approach, a speaker may be selected for each conferee from the traffic offered by the others, excluding that conferee's own signal. In this scheme, the actual speaker hears some "speaker" chosen from the idle conferees. The disadvantage is that a line with a high noise level will be selected over a voice line of low level.

U.S. Pat. Nos. 3,958,084 and 3,699,264 disclose conference circuits utilizing techniques for selecting the loudest speaker.

SUMMARY OF THE INVENTION

The present invention relates to a non-linear adder circuit for teleconferencing. A pre-determined number of most significant bits is utilized from a first PCM signal to select one of a plurality of PROMs. Each of the PROMs receives a second predetermined number of bits other than the bits used for selecting from the first PCM signal and a predetermined number of bits from a second PCM signal. At unique address locations within the PROMs, the sum of the first and second PCM signals are stored. From these address locations a third PCM signal is outputted which is a non-linear addition of the first and second PCM signals.

OBJECTS OF THE INVENTION

It is a primary object of the present invention to provide an improved circuit for teleconferencing for use with digital voice transmission.

It is another object to provide a circuit which prevents choppiness and clipping of relatively weak circuits.

It is yet another object to provide a circuit which employs non-linear addition to the digital signals.

It is a further object to provide a circuit which is reliable and economical to manufacture.

BRIEF DESCRIPTION OF THE DRAWINGS

The features of the present invention which are believed to be novel are set forth with particularity in the appended claims. The invention, together with further objects and advantages, may best be understood by reference to the following description taken in conjunction with the accompanying drawings, in the several figures of which like reference numerals identify like elements, and in which:

DESCRIPTION OF THE PREFERRED EMBODIMENT

The present invention is a novel approach to teleconferencing for use with digital voice signals. As is well known in the prior art, pulse code modulation (PCM) techniques are used to sample a voice signal within a pre-determined time frame. Typically, this results in an 8-bit word which can uniquely identify the speaker. In one method of teleconferencing, the PCM words of two speakers are combined and presented to a third speaker. The alternative approach of only presenting the loudest speaker to the third speaker has disadvantages such as noisy lines which are louder than either of the first or second speakers. The novel invention applies non-linear adding to the PCM signals to achieve teleconferencing.

Figure 1A:
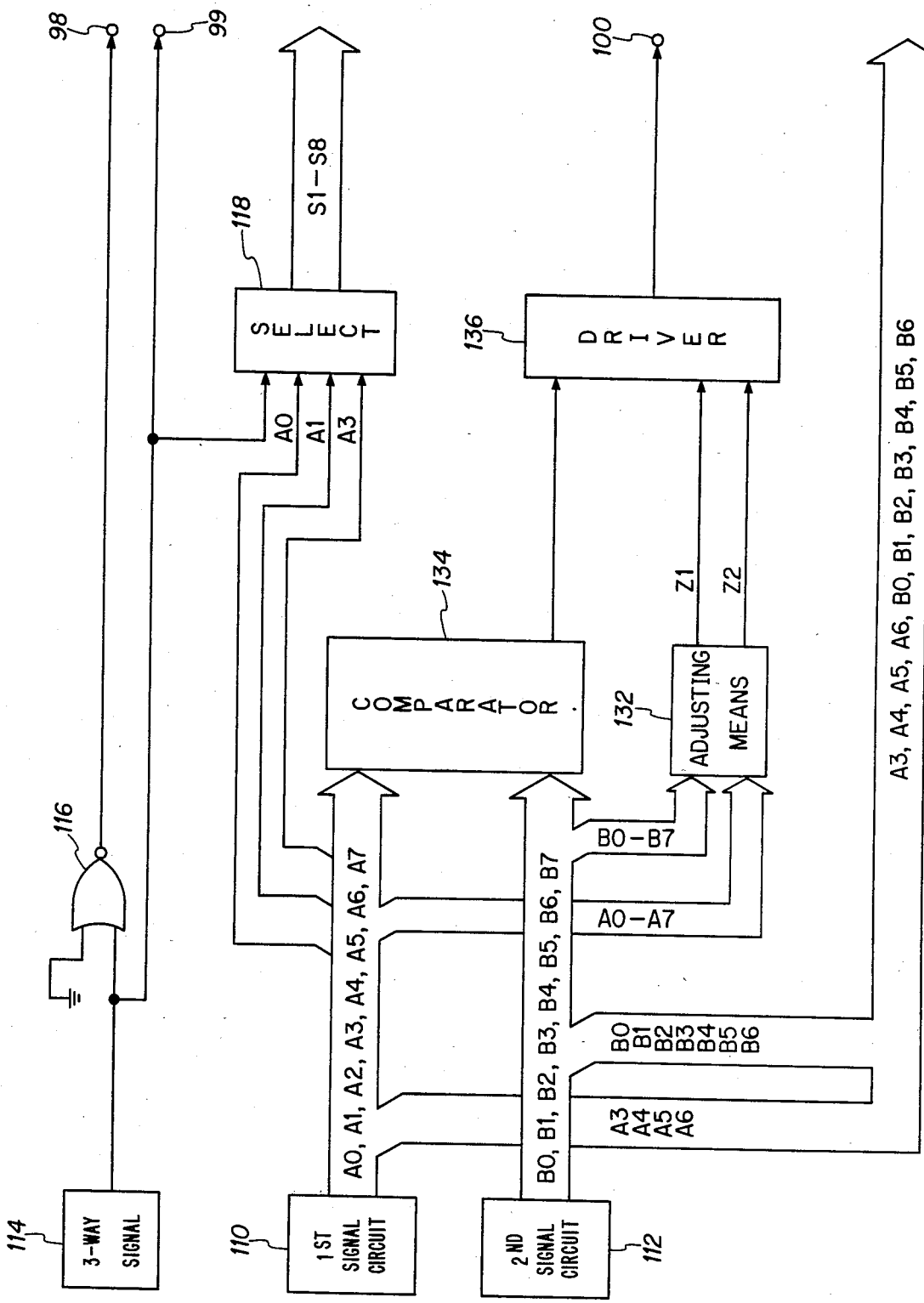
FIG. 1A is a first portion of a block diagram of a preferred embodiment of the present invention showing the flow of data and also illustrating electrical control signal connections.
Figure 1B:
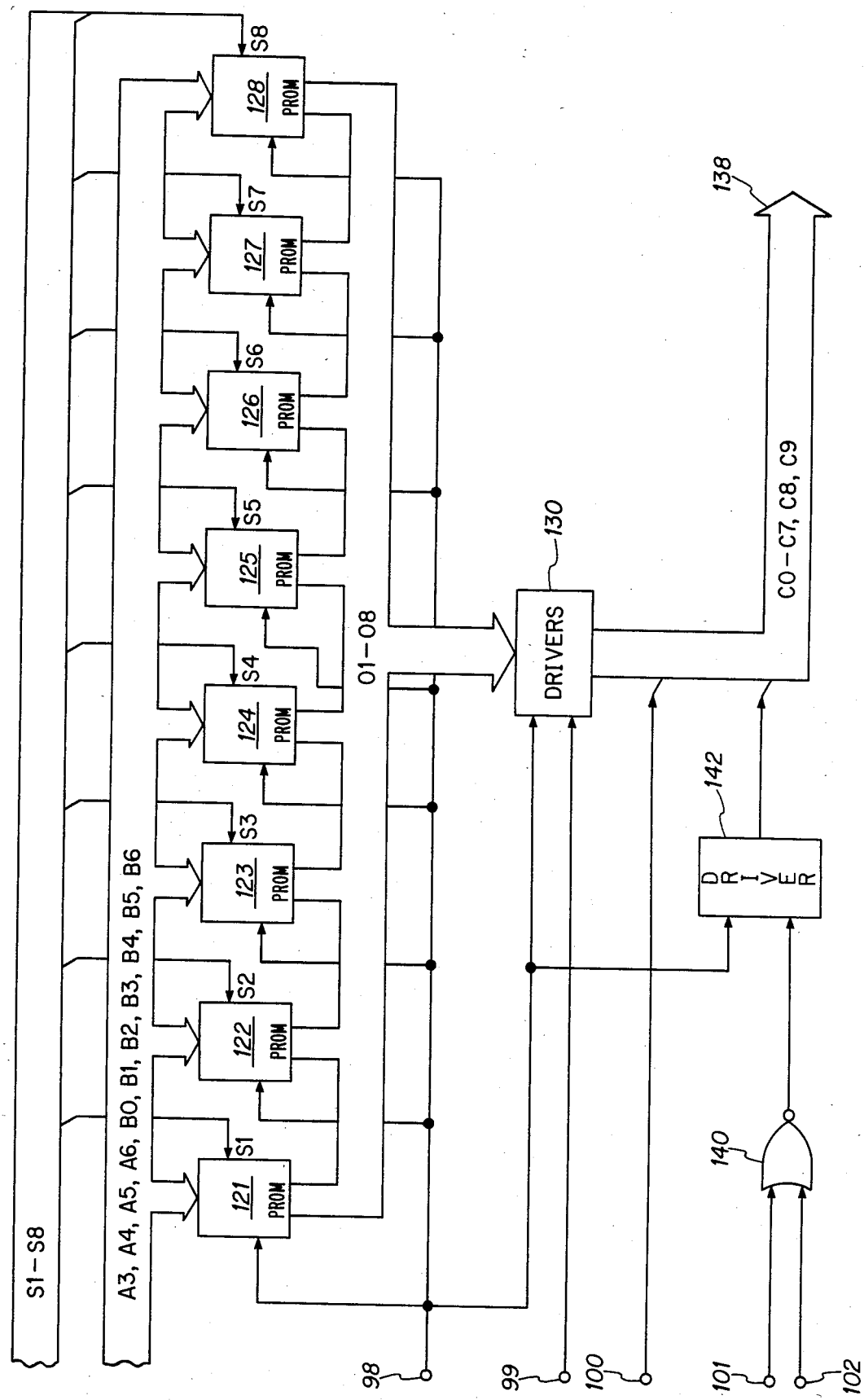
FIG. 1B is a second portion of the FIG. 1A block diagram, the left side of FIG. 1B connecting to the right side of FIG. 1A at the corresponding numerical designations.

FIGS. 1A and 1B illustrate in block diagram form the preferred embodiment of the present invention. Standard circuits in the art are utilized to provide a first PCM signal 110 for a first speaker, and a second PCM signal 112 for a second speaker. The PCM signals 110 and 112 each have 8 bits, the first being the most significant bit (MSB) and the last bit being the least significant bit (LSB). Typical notation is to number the bits 0 to 7, with 7 being the least significant bit and 1 being the most significant bit, and bit 0 indicating positive or negative amplitude.

Circuit 114 provides a signal indicating whether a 3-way conference is in progress or not. A digital low from signal 114 indicates the presence of teleconferencing, and appears at terminal 99. The signal is sent through nor gate 116 such that a signal logically opposite to the add-on terminal 99 appears on terminal 98. These signals are used to enable and disable other circuits as will be described. The bits in PCM signal 110 are termed A0–A7 and the bits in the PCM signal 112 are termed B0–B7, A7 and B7 being the least significant bits.

In the preferred embodiment, the non-linear adding is implemented in a PROM (Programmable Read Only Memory) select decoder circuit 118 and a PROM array consisting of PROMs 121–128. The Prom-selected decoder circuit 118 receives the first three significant bits A0, A1, and A2 of the first PCM signal and outputs a select signal on one of 8 possible lines, S1–S8. The decoding employed is a binary to-decimal conversion.

Thus, only one select line of S1–S8 is enabled for any given logical state of A0, A1, and A2. Each of the lines, S1–S8 is connected to one of the PROMs 121–128.

Except for the least significant bits, the remaining bits A3, A4, A5, and A6 of the first PCM signal and the bits B0–B6 of the second PCM signal are used to address a location within one of the selected PROMs 121–128. The combination of these inputs with a signal on one of the S1–S8 lines uniquely selects one address location within the PROM array. The addressed location contains the non-linear addition of the PCM address bits. The outputs O1–O8 of the PROMs are driven by appropriate driver circuits 130 for outputting a third PCM signal 138 wherein the bits are provided by the outputs O1–O8.

An adjusting means 132, which includes a comparator, receives bits A0 through A7 and bits B0 through B7 of the first and second PCM signals 110 and 112, respectively. The adjusting means 132 compares the absolute value of the first and second PCM signals 110 and 112. Each of the PCM signals 110 and 112 include a three-bit step. When the steps of the PCM signals 110 and 112 are not the same, the adjusting means outputs the least significant bits, A7 and B7, at Z1 and Z2, respectively. When the steps are the same and the sign bits are different, the adjusting means 132 subtracts the least significant bits and outputs the results at Z1 and Z2. When the steps are the same and the sign bits are the same, the adjusting means 132 adds the least significant bits and outputs the result at Z1 and Z2.

Comparator 134 compares the absolute value of the first and second PCM signals. If the second PCM signal is greater than the first PCM signal, driver circuit 136 selects and outputs the least significant bit of the second PCM signal and vice versa. The third PCM signal 138 is formed of bits designated C0 through C7. Bit C8 is provided for signalling, and is supplied by signalling inputs 101 and 102 through nor gate 140, and driver circuit 142. The least significant bit C7 is supplied from the driver circuit 136 on terminal 100. Bit C9 is an error-detecting bit whose state is a function of the states of C0 through C7.

To consider an example of the operation of the invention, a reference is first made to the accompanying Table which includes excerpts of $\mu$-Law PCM binary code and also includes the equivalence in linear code and analog voltage values.

As an example of the operation of the invention, assume the PCM signal 110 has a PCM binary value of 010 1000, which is the equivalent of an analog signal of 81 mV and that the PCM signal 112 has a PCM binary value of 100 1111, which is the equivalent of an analog signal of 486 mV. Assume further that the sign bit of both signals, bit 0, is the same. Adding the PCM binary signals while disregarding the non-linearity of the PCM binary signals results in the following:

$$\begin{array}{r} 010\ 1000 \\ \underline{100\ 1111} \\ 111\ 0111 \end{array}$$

Referring to the Table, the resultant sum, 111 0111, has an analog equivalent of 2980 mV. However, the desired result is as follows:

$$\begin{array}{r} 486\ mV \\ \underline{81\ mV} \\ 577\ mV \end{array}$$

577 mV is the approximate equivalent to a PCM binary value of 101 0010.

The PCM signals 110 and 112 function as address lines to storage arrays or PROMs (121–128), and the PCM signals 110 and 112 as described above, address a unique location within the PROMs 121–128. Stored at this location is the PCM binary value 101 0010 which is the non-linear sum of the two PCM address signals 110 and 112.

The actual addition of the signals is performed by a means capable of summing linear code. As can be seen from the accompanying table, PCM binary signals have a range of 0 mV to 4,000 mV, therefore 2 equals 4000, and if n is equal to 12, it takes 12 bits to linearize the PCM signal. In the example above, 81 mV is equivalent to 0000 0010 1001 in linear code, and 486 mV is equivalent to 0001 1111 0010 in linear code, and performing the addition results in the following:

$$\begin{array}{r} 0001\ 1111\ 0010 \\ \underline{0000\ 0010\ 1001} \\ 0010\ 0010\ 1010 \end{array}$$

Referring to the Table, it is observed that the result has an analog voltage equivalent of 541 mV, which is much closer to the desired result of 577 mV than the result obtained from the direct addition of the two PCM binary signals. Referring again to the Table, the value in the PCM binary 101 0010 is the value placed in the PROM at the unique location addressed by PCM signals 110 and 112. Ultimately the PCM binary value is transmitted to a digital/analog converter for conversion of the PCM binary signal to an analog voltage value for use by a subscriber.

This invention is not limited to the particular details of the apparatus depicted, and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

TABLE

| Linear Code | PCM Binary | Voltage |
| --- | --- | --- |
| 0000 0000 0000 | 000 0000 | 0 mV |
| 0000 0000 0001 | 000 0001 | 1 mV |
| . . . | . . . | . . . |
| 0000 0100 1111 | 010 0111 | 77 mV |
| 0000 0101 0011 | 010 1000 | 81 mV |
| 0000 0101 0111 | 010 1001 | 85 mV |
| . . . | . . . | . . . |
| 0001 1110 0001 | 100 1110 | 470 mV |
| 0001 1111 0010 | 100 1111 | 486 mV |
| 0010 0000 1010 | 101 0000 | 510 mV |
| 0010 0010 1010 | 101 0001 | 541 mV |
| 0010 0100 1011 | 101 0010 | 573 mV |
| 0010 0110 1100 | 101 0011 | 605 mV |
| . . . | . . . | . . . |
| 1011 0110 1000 | 111 0110 | 2852 mV |
| 1011 1110 1100 | 111 0111 | 2980 mV |
| 1100 0110 1110 | 111 1000 | 3107 mV |
| . . . | . . . | . . . |
| 1111 0111 1101 | 111 1110 | 3872 mV |
| 1111 1111 1111 | 111 1111 | 4000 mV |

What is claimed is:

1. A non-linear adder circuit for teleconferencing comprising:
    means for providing a first PCM signal having a pre-determined number of bits;
    means for providing a second PCM signal having a pre-determined number of bits:
    means for providing a conferencing signal;
    means for selecting which receives a first selected number of most significant bits of said first PCM signal and outputs a select signal;
    plurality of programmable read only memory (PROM) circuits which receive as a 12-bit binary input, the 4th through 7th MSB of the first PCM signal, the 7th MSB of the second PCM signal, said select signal, and said conference signal, said PCM signals thereby identifying a unique address location within said PROMs; and
    means for outputting a third PCM signal from said address location within said PROMs, said third PCM signal having a predetermined correspondence with said first and second PCM signals.

2. A non-linear adder circuit for teleconferencing comprising:
    means for providing a first 8-bit PCM signal and a second 8-bit PCM signal;
    means for providing a conference signal;
    means for selecting which receives the three MSB's of said first PCM signal and which performs a binary to digital conversion and outputs a select signal;
    a plurality of programmable read only memories (PROMs) which receive the 4th through 7th MSB of said first PCM signal, the 7th MSB of said second PCM signal and said conference signal and said select signal, said PCM signals thereby identifying a unique address location within said PROMs; and
    means for outputting a third PCM signal from said address location within said PROMs, said third PCM signal having a predetermined correspondence with said first and second PCM signals.

* * * * *